May 29, 1956  J. R. GRETZINGER  2,747,744
OIL FILTER
Filed Nov. 4, 1948  6 Sheets-Sheet 1

Inventor
John R. Gretzinger
By
Spencer, Willits, Helwig & Baillio
Attorneys May 29, 1956 J. R. GRETZINGER 2,747,744
OIL FILTER
Filed Nov. 4, 1948 6 Sheets-Sheet 2

Inventor
John R. Gretzinger

May 29, 1956 J. R. GRETZINGER 2,747,744
OIL FILTER
Filed Nov. 4, 1948 6 Sheets-Sheet 4

Inventor
John R. Gretzinger
By
Spencer, Willits, Helmuth & Baillie
Attorneys

May 29, 1956     J. R. GRETZINGER     2,747,744
OIL FILTER Filed Nov. 4, 1948     6 Sheets-Sheet 5

United States Patent Office 2,747,744
Patented May 29, 1956

2,747,744
OIL FILTER

John R. Gretzinger, Lake Fenton, Mich., assignor to General Motors Corporation, Detroit, Mich., a corporation of Delaware Application November 4, 1948, Serial No. 58,283

9 Claims. (Cl. 210—183)

This invention relates to an oil filtering system and an oil filter for the lubricating oil of internal combustion engines.

The object of the invention is to provide an economical and simplified high capacity filtering system for internal combustion engines.

An object of the invention is to provide a high-capacity surface filter element formed of a sheet of resin-impregnated paper folded to form a bellows mounted on a central perforated support tube which is sealed by a clamp to the bellows at both ends.

An object of the invention is to provide a clamp seal for a bellows filter unit employing a bellows having longitudinally offset pleats so that each end has some full pleats and some partial pleats.

Further objects of the invention, relating to the construction and arrangement of parts will become apparent from the following description of specific embodiments read in conjunction with the drawings, in which.

The filtering systems shown in the drawing employ as the basic surface filter element one or more prism-shaped bellows folded from a single sheet of filter material, such as paper, laminated paper, cloth or wire mesh. Preferably paper impregnated with a resin, such as phenol, formaldehyde, is used because it can be readily folded and then cured to increase the wet strength and stiffness, so that the bellows shape is maintained in use under external pressure.

Though the bellows filter element may be made in various prismatic forms, an octagonal prismatic bellows, which is simple to form and closely approximates a cylinder and thus has a high surface area per unit of volume, is illustrated in Figures 1 to 5.

The bellows filter element is folded from a single blank 10. The fold lines shown in Figure 1 for an octagonal prismatic bellows may be scored or indented to define the fold lines and facilitate folding. The fold lines provide four longitudinal series of trapezoidal pleat sections of approximately equal size. In each series the trapezoidal pleat sections have both the long and the short base thereof in common with an adjacent section. Each longitudinal series of pleat sections is displaced a distance equal to the height of a trapezoidal pleat section with relation to the adjacent longitudinal series.

Figure 1:
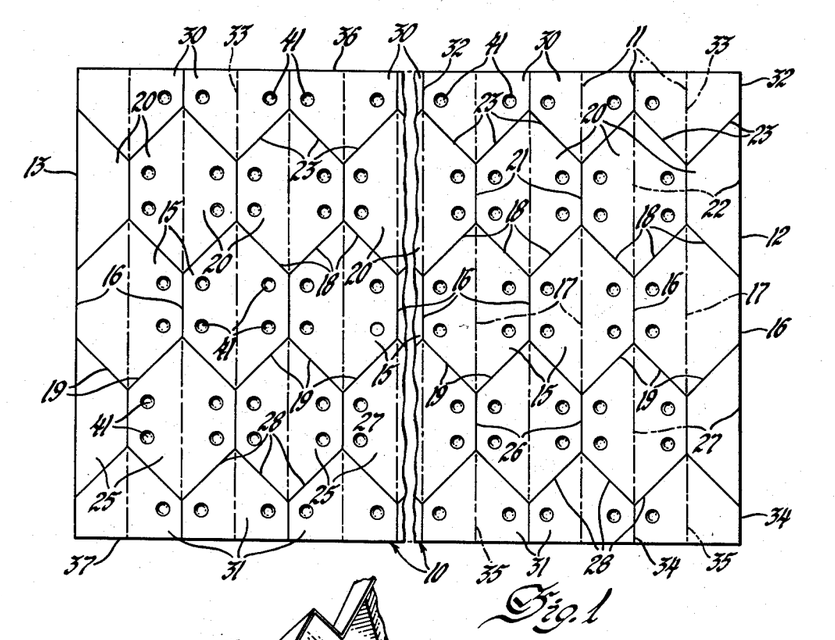
Figure 1 is a plan view of the filter material blank showing the fold lines.

The fold-line pattern which divides the rectangular blank 10 into four longitudinal series of trapezoidal pleat sections is formed by first laying out a series of fold lines 11 equally spaced and parallel with respect to the end edges 12 and 13 of the blank. The central series of trapezoidal pleat sections 15 is defined by locating alternately at the center of each of the transverse fold lines 11 and end edges 12 and 13 the short trapezoidal base 16 and the long tapezoidal base 17, and connecting the ends of each adjacent long and short base by the diagonal fold lines 18 and 19.

The second series of trapezoidal pleat sections 20 is formed above the first series 15. The short base 21 and long base 22 of each trapezoidal section 20 are alternately laid off on the transverse fold lines 11 and end edges 12 and 13. A short base 21 will be contiguous with the long base 17 of the first series and a long base 22 will be contiguous with the short base 16 of the first series. The diagonal fold line 23 will form the top edge of the trapezoidal sections 20, while the fold line 18 forms the bottom edge.

The third series of trapezoidal sections 25 is formed in the same manner as the second series 20 with short bases 26 and long bases 27 alternately laid off on the fold lines 11 and end edges 12 and 13 and diagonal fold lines 28 connecting the ends of short bases 26 and long bases 27.

The fourth series of trapezoidal pleat sections is formed in two parts in order to locate the seam of the filter bellows on one side. One part 30 is located at the top and the other part 31 is located at the bottom of the blank 10. The short bases 32 and 34 of each part 30 and 31 have a length equal to half the short base 16 and the width of the seam overlap. The long base 33 and 35 similarly has a length equal to the long base 17. Though the long and short bases of pleat sections 30—31 are divided into two equal parts, they may be divided unequally if it is desired to have the seam near a corner of the prismatic bellows rather than at the center of a side. It will be noted that along each transverse fold line 11 there are alternately arranged two long and two short base lines. Thus the ends of the long and short base parts 32 and 33 for the top part 30 of the fourth tapezoidal pleat section may be connected by a straight line 36 which is the top edge of the blank. Similarly the base parts 34 and 35 for the bottom part 31 are connected by a straight line 37 which is the lower edge of the blank.

Figure 2:
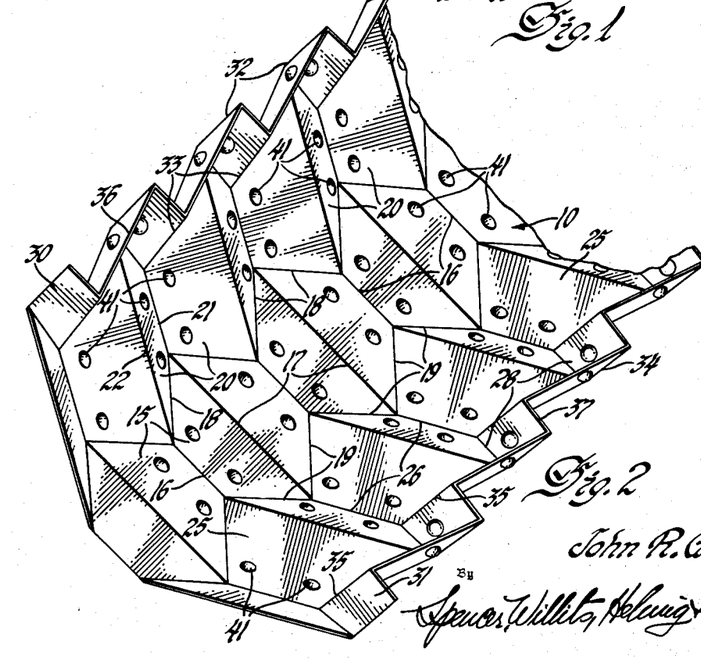
Figure 2 is a fragmentary perspective of the filter blank partially folded.
Figures 3, 5:
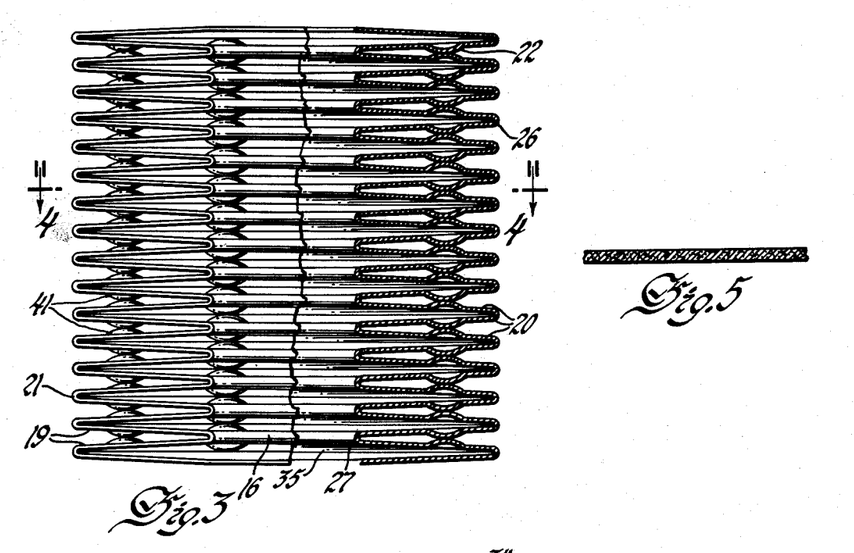
Figure 3 is a plan view of the folded-bellows filter element with a part thereof in section.
Figure 5 is an enlarged fragmentary section of the impregnated filter paper.

If the blank 10 is scored for folding, the long bases 17, 22, 27 and 33—35 are scored for inward folding as indicated by the dot-and-dash lines. All the other fold lines are folded outwardly. As shown in Figure 2 the blank may be folded by bringing the edges 36 and 37 toward each other to form a cylindrical shape and at the same time starting the folds on the fold lines. After the edges are secured together by lap seam 39, the folds are completed and the ends compressed to form the bellows filter unit shown in Figures 3 and 4.

The external side surfaces of the bellows are formed by the series of short bases 16, 21, 26 and 32—34 of the trapezoidal pleat sections and the diagonal fold lines 18, 19, 23 and 28. The trapezoidal pleat sections 15, 20, 25 and 30—31 are arranged in pairs connected by the short base fold line to form outwardly extending pleats which are referred to by the same reference number as the section thereof. The pleats 15 and 30—31 are oppositely disposed and at the same level. The other pair of pleats 20 and 25 are disposed at right angles and just above and below pleats 15 and 30—31. The diagonal fold lines 18, 19, 23 and 28, which form the intermediate side portions, are sloped to interconnect the adjacent overlain pleats. The inner edges 17, 22, 27 and 33—35 form the edges of a square internal aperture and extend outwardly within the adjacent pleat. It will be seen, referring to Figures 3, 4 and 6, that the folded bellows has the external form of a right hexagonal prism with a square aperture extending centrally through the length of the prism. The longitudinal axis of the bellows is located at the center of the prism and the square aperture or in Figure 6 coaxially with the longitudinal axis of central post 58. Bosses 41 may be embossed in the paper to properly space the pleats. These bosses may protrude from either or both sides of the paper and may be omitted from the end pleat sections as shown. The internal spacing between each pleat section of a pleat is maintained by the adjacent pleat extending between the pleat sections at each end. The sectional view taken through pleats 15 and 30—31 shown in Figure 4, which will be the same as a view of either end, shows a rectangular opening formed by the long bases 22 and 27 of two opposed pleat sections 20 and 25 respectively, and short bases 16 and 32—34 of pleat sections 15 and 30—31 respectively. A section taken through pleats 20 and 25 would merely show the rectangular opening rotated through 90° and formed by the opposite side of each trapezoidal pleat section. Thus it will be seen that the number of trapezoidal pleat sections in the longitudinal series is not critical.

Figures 16, 17, 18:
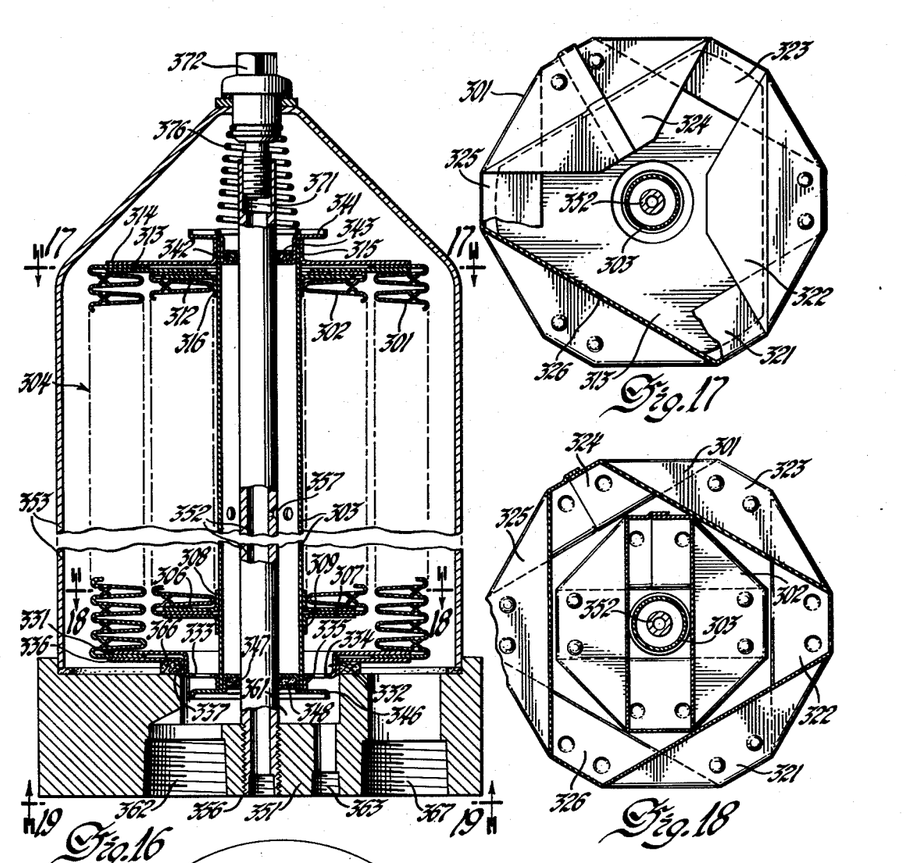
Figure 16 is a section of a modified coarse and fine filter employing the bellows filter units in series.
Figure 17 is a section of Figure 16 on the line 17—17 showing the folded end of the coarse bellows filter.
Figure 18 is a section of Figure 16 on the line 18—18 showing the nested bellows filter units.
Figure 19:
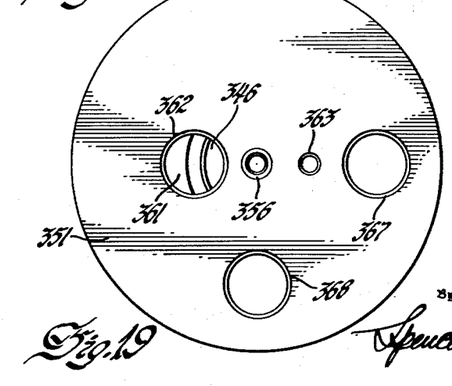
Figure 19 is a bottom view of the filter shown in Figure 16 on the line 19—19

In forming the fold lines on the blank 10 the short bases, such as 16, of the trapezoidal pleat sections should have a length equal to the length of a side of the octagonal form desired. The diagonal lines, such as 18, should be about 45 degrees to the base line and about the same length as the short base to form a regular octagonal bellows. This form of bellows will provide the largest efficient filter area per unit volume with a low pleat depth and a central aperture. However, the dimensions may be varied through a wide range to produce other bellows shapes. Thus the short side may be reduced if a prism with smaller alternate sides 16, 21, 26 and 32—34 and a smaller aperture is desired. If the short side is reduced to a point or eliminated, the bellows will be in the form of a square prism without a central aperture. This form has a larger filter area per unit volume but is less efficient due to the large pleat depth. The bellows may also be formed with any even number of sides by forming the blank with additional series of trapezoidal pleat sections. For a regular figure the angle between the base of the trapezoidal pleat section and the sloping end should be equal to the external angle between one side and an extended adjacent side of a polygon having the same number of sides. A section of a polygonal bellows having 12 sides or a dodecagonal prismatic bellows is shown in Figure 18.

This paper bellows surface filter unit may be incorporated into a fluid pressure filter such as a lubricating oil filter suitable for use on internal combustion engines. One form of the invention shown in Figures 6, 7 and 8 may be mounted directly on the engine block or may be connected to a separate base fitting as shown in connection with the modified forms.

Figure 4:
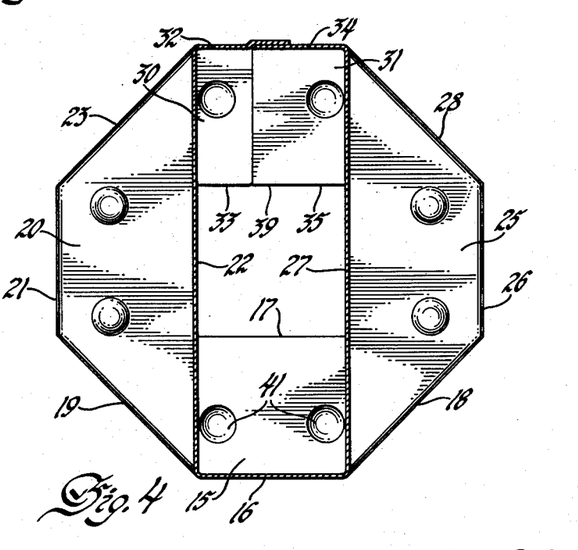
Figure 4 is a cross section of Figure 3 on the line 4—4.
Figure 6:
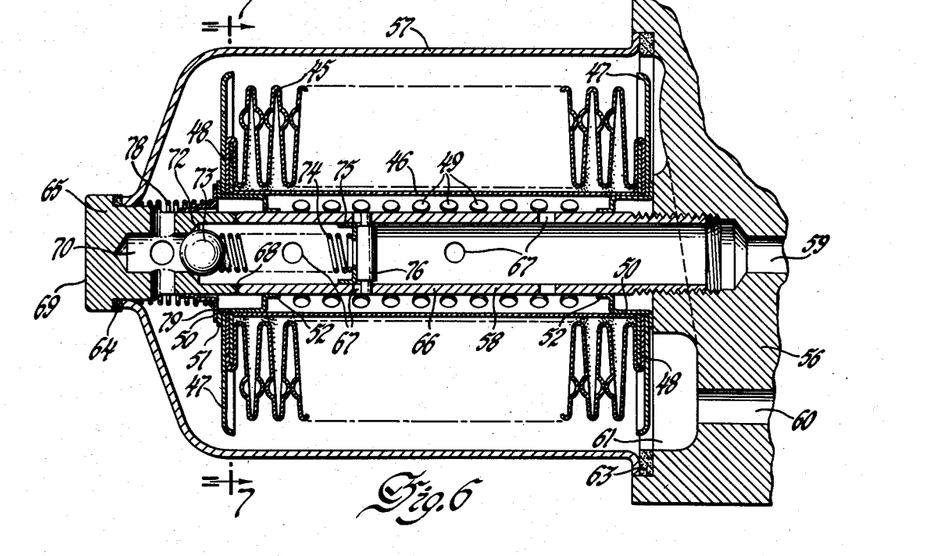
Figure 6 is a sectional view of a filter employing the bellows filter unit.
Figure 7:
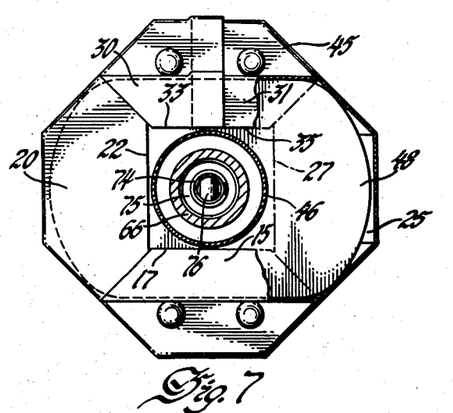
Figure 7 is a cross section with a part broken away of Figure 6 on the line 7—7.

The bellows filter unit 45 which has rectangular openings at each end as shown in Figure 4 is mounted over a tube 46 with perforations or holes 49 and sealed at the end by the end plates 47 and clamping plates 48, as shown at the left in Figure 6. The clamping plate 48 has a generally rectangular shape with rounded ends. The rounded ends are positioned under the pleat sections 20 and 25 and over the inner portion, preferably the inner half, of pleat sections 15 and 30—31. Then the outer portion of these pleat sections are folded over the clamping plate 48 so that the filter material encloses the edge portions, and the material on the outside of the plate 48 may be clamped between the clamping plate 48 and the end plate 47. The clamping plate 48 and the end plate abut the end of tube 46 at both ends and are secured thereto by a bushing 50 fitting within the tube 46. The bushing 50 is secured to the tube 46 preferably by spot welding and has a flange 51 engaging and preferably spot welded to the end plate and clamps both plates to the tube to provide a fluid seal for the end of the bellows unit. The bushing also has a sealing flange 52 which will be described below. The other end of the filter bellows is secured to the tube in the same manner to form the filter element.

During the folding of the bellows and securing the bellows 45 to the tube 46, the resin-impregnated paper is very flexible and soft since the resin is uncured. After the filter element is assembled the resin-impregnated paper is cured to a degree to make it stiff and relatively hard with sufficient strength to support the external pressure of the unfiltered fluid.

Due to the horizontal interlocking arrangement of the pleats and the high strength and rigidity of the resin-impregnated paper when cured, this filter unit can support a large external pressure exerted by the unfiltered fluid. However, additional support may be provided by allowing the internal surface of the bellows filter to bear against the internal support tube.

The filter element is mounted on the engine block 56 in a housing 57 which is secured to the block by the hollow post 58. The block 56 has a threaded fluid outlet passage 59 and an inlet passage 60 leading to the distribution chamber 61. The distribution chamber has a maximum depth at the inlet passage and tapers to a minimum depth at the diametrically opposed portion to evenly distribute the oil as it enters the filter housing. The housing 57 is sealed to the block by the gasket 63 and to the post 58 by the gasket 64.

In order to simplify the manufacture of the central post 58, it is made in two parts, a bolt-like portion 65 recessed at one end and a hollow portion 66 with a plurality of apertures 67. These parts are welded together at 68. The bolt-like portion 65 has a head 69 providing a shoulder to engage the gasket 64 to seal the aperture in the housing 57, and a passage 70 connecting the outside of the post with the interior recess and hollow portion of the post 58. The passage 70 has a seat 72 and ball valve 73 to provide a by-pass valve for the filter. The ball is held in position by a spring 74 and apertured spring seat 75 which abuts on the shouldered retaining pin 76. The shouldered pin is inserted through the apertures 67 and is held in position by the spring 74.

The filter element is held in position by the spring 78 acting through the guide bushing 79 on the filter element. The sealing flanges 52 seal both the top and the bottom of the filter unit to the post. Thus the fluid, such as oil, entering at the inlet 60 will surround and pass through the filter element 45 and apertures 49 in tube 46, and via apertures 67 and the central passage of post 58 enter the outlet 59. If the fluid entering the filter exceeds the capacity of the filter due to excess fluid pressure or clogging of the filter the by-pass valve will open to permit the fluid to flow directly from the inlet to the outlet via the passage in the post.

Figure 8:
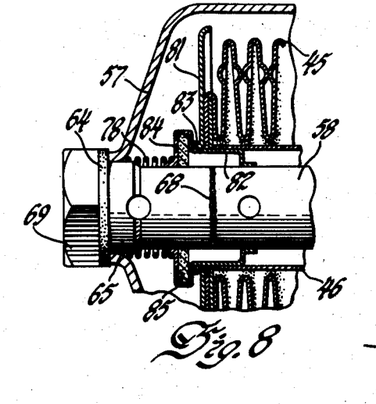
Figure 8 is a fragmentary view of the filter shown in Figure 6 showing a modification.

In Fig. 8 a filter of the type shown in Figure 6 with a modified form of seal employed at the outer end of the filter element is shown. The end plate 81 has an upstanding flange about which the end of the bushing 82 is crimped to form a sealing bead 83 which provides a line contact seal. The guide bushing 84 for the spring 78 has a gasket 85 engaging the bead to provide a more secure fluid seal.

The central tube, in addition to supporting the end and clamping plates at each end of the bellows, may also provide internal support to prevent the bellows from collapsing under pressure. In each of the forms of the invention the bellows filter may closely surround the tube so that the tube can provide internal support for the paper bellows. The small initial clearance may be provided to facilitate assembly. The external fluid pressure will immediately force the central portion of the inner edges of the bellows in contact with the tube. The substantially radial position of the pleats will provide high strength to resist radial compression by the fluid. Since each pleat is in contact with the adjacent pleats, the forces tending to laterally displace the pleats will be transmitted to and resisted by the end plates. It will be noted that the two pleat sections forming each pleat are maintained in spaced relation by the adjacent pleats which extend between the pleat at each end thereof. Thus the complete external surface of the filter is exposed to the unfiltered fluid, and suitable internal drainage passages are provided.

Figures 9, 10, 11:
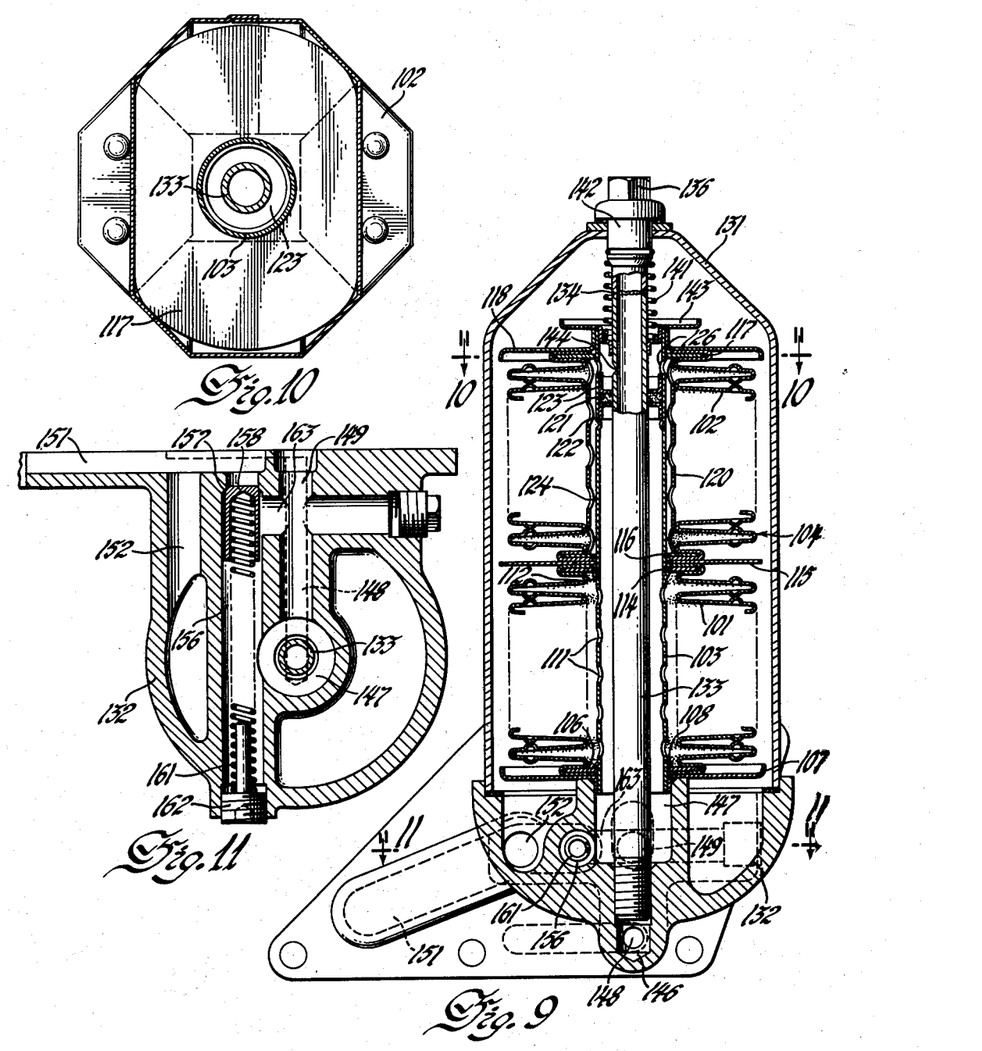
Figure 9 is a partial cross section of a fine and coarse filter employing the bellows filter units.
Figure 10 is a section of Figure 9 on the line 10—10 with broken-away portions of the pleats shown in dot-and-dash lines.
Figure 11 is a section of Figure 9 on line 11—11 showing the filter base.

A combination full-flow and partial-flow filter may be made by employing two or more bellows filter units. The full-flow filter unit is formed of a coarse filter paper, either a single-ply or a multiple-ply, resin-impregnated paper and the partial-flow filter unit 102 is formed of a fine filter paper, either a single-ply or a multiple-ply, resin-impregnated paper.

Both of these filter units are mounted on a tube 103 to form a combination filter element 104. The bottom end of the coarse filter 101 is secured to the tube 103 by clamping plate 106 and bottom plate 107. The clamping plate 106 has the same form as clamping plate 48, and the edges of the bellows filter unit 101 are folded around the clamping plate in the same manner as described above in connection with Figures 6 and 7. The clamping plate 106 abuts against detents 108 on the tube and the central flange on the bottom plate 107 is secured preferably by welding the flange to the tube.

The tube 103 has a series of apertures 111 in the region covered by the coarse filter unit 101 and above the apertures a detent 112. The top clamping plate 114, having the same shape, abuts on detent 112, and the top end of coarse filter unit 101 is folded about the clamping plate in the same manner. A central plate 115 engages and secures this end of coarse filter 101. The lower end of fine filter 102 is then folded about another clamping plate 116 and positioned on center plate 115. A strut tube 120 with apertures 124 is positioned in fine filter 102 and around tube 103, with sufficient clearance to provide for fluid passage between the tubes. The clamping plate 117 is inserted in the top end of fine filter 102 in the same manner, and abuts on the top end of strut tube 120. The top end plate 118 is then positioned in clamping relation and welded to the tube 103 to clamp and secure the top end of fine filter 102 and to exert a clamping force through strut tube 120 to clamp the bottom of fine filter 102 and the top of coarse filter 101. The tube 103 has an annular seal 121 located near the upper end of fine filter 102. The seal 121 is secured by lower retainer 122 which is positioned by a detent and upper retainer 123 which is welded to the tube. Above seal 121 the tube is apertured at 126 to provide a passage for the fine filtered oil.

The combination filter element 104 and the housing 131 is secured to the base 132 by the post 133. This post may be formed in two parts and welded together at 134 in the same manner as post 58. The post extends through a central aperture at the top of the housing and has a bolt-like head portion 136 engaging the housing and clamping it to the base. Gaskets may be employed between the head and the housing and the housing and base. A spring 141 is located around the post and positioned by a shoulder 142. The spring 141 acts on a sealing bushing 143 which has sealing flanges engaging the post 133 and tube 103 to provide a fluid seal at the top of the combination element and to force the combination element against the base. The post 133 has a metering orifice 144 between seal 143 and annular seal 121.

The base 132 has a central threaded passage 146 and a coaxial and larger bore or recess 147 above the passage. The threaded end of post 133 is screwed into the passage to hold the housing and element to the base. The passage 146 is connected with the fine filtered fluid outlet 148 and the bore 147 is connected with the coarse filtered fluid outlet 149. The inlet has a lateral passage 151 leading to the passage 152 which connects the inlet to the internal hollow portion of the base. The inlet passage also connects with by-pass valve bore 156 having a seat 157 on which valve 158 operates. A spring 161 positioned by stop plug 162 normally holds the valve 158 in closed position against seat 157. The by-pass passage 163 connects the valve bore 156 to the coarse filtered fluid outlet 149 and also extends to the exterior of the casing to provide a cleaning plug.

When this filter is installed in the lubrication system of an internal combustion engine the oil from the pump enters the inlet passages 151 and 152 and fills the housing 131 surrounding both the coarse filter unit 101 and the fine filter unit 102. The spring 141 holds the combination unit in position and the seal bushing 143 seals the top end, while the plate 107 engages the bore 147 in sealing engagement to seal the bottom end. Large quantities of coarse filtered oil pass through the coarse filter unit 101 and apertures 111 to enter the space between the post 133 and tube 103. This space is sealed at the upper end by seal 121 but is opened through bore 147 and outlet 149, so that the coarse filtered oil may pass without appreciable reduction in pressure to the engine lubricating system. The small quantities of fine filtered oil that will pass through the fine filter 102 pass through the apertures 124 and 126 to the space between tube 103 and post 133 between annular seal 121 and bushing seal 143. From this space the oil flows through the metering orifice 144 which limits the flow, into the center of hollow post 133, where it drains under no pressure through passages 146 and 148 to the crankcase. The metering orifice 144 limits the flow through the fine filter 102, and thus maintains the pressure on the coarse filter and the engine lubricating system, even though there is a break or hole in the fine filtering element.

A modified construction of a full and partial flow filter element 205 is shown in Figures 12 to 15. The coarse filter bellows 201 is mounted on a perforated tube 203 and the fine filter bellows 202 is mounted on a similar perforated tube 204. The clamping plate 206 is shaped and positioned within the bottom end of the coarse filter bellows 201, and the bellows pleats are folded in the same manner as described above in connection with clamping plate 48. However, the clamping plate 206 also has a peripheral bead 207 to provide line contact in clamping the paper bellows and to increase the clamping pressure by bulging the clamping plate 206 and end plate 208. The clamping plate and end plate with the bellows therebetween is positioned abutting the end of tube 203 and the fastening bushing 209 is positioned in the tube and secured preferably by welding to both the tube end and the end plate 208. The bushing 209 has a short sealing flange 211 to seal this end of the filter element 205 with the base. The upper end of coarse filter bellows 201 is similarly sealed by a clamping plate 212 with a bead 213 and an end plate 214 secured to the tube 203 by the fastening bushing 216. This bushing 216 has a long sealing flange 217 to engage the central post 243.

Figures 12, 13, 14, 15:
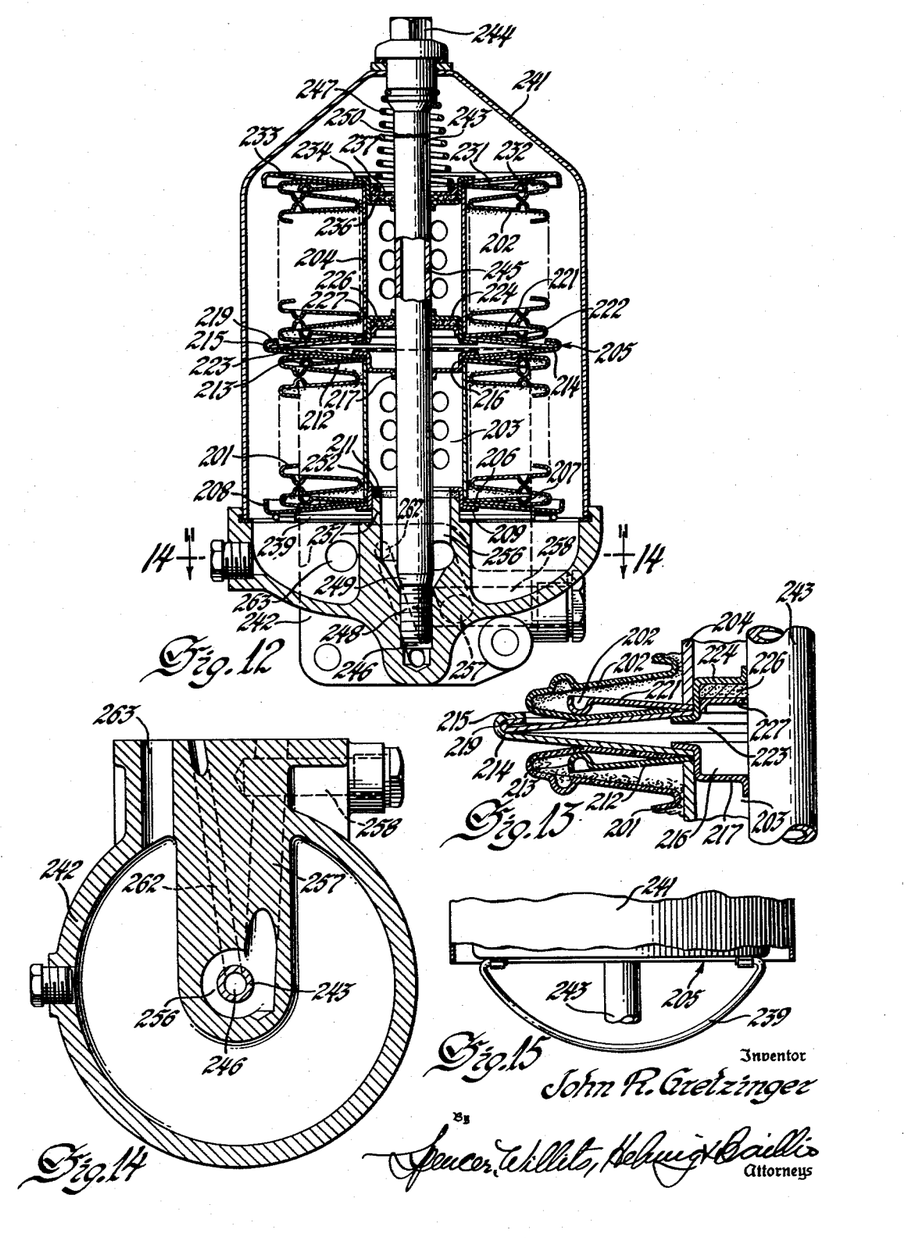
Figure 12 is a section of a modified fine and coarse filter employing the separate bellows filter units.
Figure 13 is a fragmentary enlargement of Figure 12 showing the securing means between the two bellows filter units.
Figure 14 is a section of Figure 12 on the line 14—14 showing the base.
Figure 15 is a partial fragmentary view of Figure 12 showing the housing and filter unit with handle.

The fine filter bellows 202 is similarly clamped at the base by clamping plate 221 with bead 222 and end plate 223 secured to the tube 204 by fastening bushing 224. The bushing 224 has an annular seal 226 held in position by retainer 227 which is secured to the bushing by a press fit or welding. The top end of bellows 202 is sealed to the tube by a clamping plate 231 with bead 232 and end plate 233 which is secured to tube 204 by fastening bushing 234. A flange on bushing 234 supports annular seal 236 which is held in position by retainer 237 secured thereto.

The centrally located end plates 214 and 223 have flanges 215 and 219, respectively, at the outer edge. These flanges 215 and 219 are initially upstanding as on the other end plates 208 and 233, but are crimped over as shown in Figure 13 to secure the combination coarse and fine filter element 205 together. A bail 239 is attached to the bottom of the filter element 205 to facilitate handling in removal and replacement of the filter element.

A housing 241 with a central aperture at the top and the filter element 205 is secured to the base 242 by a hollow post 243 having a solid headed end 244, a metering aperture 245 and a reducing taper 249 at threaded end 248. The headed end 244 and the hollow post part 243 of the post may be formed of two parts welded together at 250 in the same manner as post 58. The post is positioned in the central aperture in the housing 241 and the filter element 205, and is threaded into a threaded passage 246 in the base to secure the housing and filter element to the base. A spring 247 secured to the post by a shoulder engages the seal retainer 237 to hold the element 205 in sealed contact with the base. An annular boss or shoulder 251 surrounding recess 256 fits within the bushing 209, and gasket 252 may be used to provide a better seal between the bottom of the filter and the base.

The base has a counter-bore 256 in the boss 251 coaxial with passage 246. The bore 256 has a larger diameter than post 243 to provide a passage for the coarse filtered fluid, and is connected with the coarse filtered fluid outlet passage 257. This passage 257 is provided with a transverse cleaning passage 258 with a suitable plug. The passage 246 is connected with the fine filtered fluid outlet passage 262. The inlet pasage 263 connects directly with the hollow portion of the base 242.

When this filter is used on an internal combustion engine the fluid, such as oil, enters the filter through inlet passage 263 and surrounds both the coarse filter bellows 201 and the fine filter bellows 202. The seal at gasket 252 seals the bottom and seal 236 seals the top of the filter element 205 to prevent entrance of oil to the central space. The oil flows through the coarse filter in large quantities with substantially no reduction in pressure and passes through the perforated tube 203 to the space between the tube and post 243. This space is sealed by flange 217 or seal 226 at the top and communicates through bore 256 to the outlet pasage 257. The fine filtered oil after passing through filter bellows 202 and perforated tube 204, enters the space around post 243 limited at the top by seal 236 and at the bottom by seal 226. The oil then flows through the metering orifice 245, which limits the quantity of oil flowing through the fine filter 202 to the center of hollow post 243. The oil drains through the post and passages 246 to outlet passage 262 which is connected to the crankcase of the internal combustion engine.

In the above modifications shown in Figures 6, 9 and 12, where the central post is of one-part construction or two parts welded together, the housing, filter element and post is removed as a unit from the base. Referring, for example, to Figure 12, it will be seen that in order to replace the combined filter element 205, the bolt 244 and integrally attached post 243 is unscrewed from the base 242. Then the post 243 with element 205 thereon and housing 241 is removed. Then by grasping the bail 239 the element 205 is removed from the post and a new element is placed on the post and the filter assembled. The threaded end 248 of the post has a reduced diameter and tapered connecting portion 249 to facilitate sliding the seals on the post.

In the above types of combination full-flow and partial-flow filter element, the coarse and fine filter units are arranged in parallel so that only a portion of the fluid passed through each unit. In the modification shown in Figure 16 the coarse bellows filter unit 301 and the fine bellows filter unit 302 are in series and are mounted concentrically on tube 303 to form combination element 304. All the fluid will pass through coarse filter 301, while only a portion will pass through fine filter 302.

The fine filter bellows 302 is attached to the tube 303 at a point spaced from the bottom end by a clamping plate 306 and end plate 307. The bellows 302 has an octagonal shape similar to the bellows 45 shown in Figures 6 and 7. Thus the clamping plate 306 has the same shape and is positioned and fixed to the end of the bellows in the same manner as clamping plate 48. The clamping plate 306 and end plate 307 are secured to tube 303 to clamp the end of bellows filter 302 by means such as flanges 308 and 309 respectively. The upper end of bellows 302 is secured between clamping plate 312 and an intermediate clamping plate 313. The clamping plate 312 is secured to the tube 303 by flange 316. The intermediate plate 313 acts as both the end plate for the top end of fine filter 302 and the clamping plate for coarse filter 301.

Referring to Figure 17, a coarse bellows 301 having a dodecagonal prismatic form is employed, since an octagonal prismatic form would leave too much space between the bellows. A hexadecagonal prismatic form which would fit the inner bellows exactly would involve a much more difficult folding operation and would not save much space. The dodecagonal bellows fits closely around the bellows 302 and provides a space for longitudinal fluid flow. This bellows filter 301 is formed in the same manner as filter 45 by employing a fold-line layout similar to the one shown in Figure 1 with six longitudinal series of trapezoidal pleat sections 321 to 326. Each of the pleat sections has the same trapezoidal shape. In the cross sectional view shown in Figure 18 the section plane passes through the inner edge or fold of alternate trapezoidal pleat sections 321, 323 and 325 and the outer edge of the intermediate pleat sections 322, 324 and 326 as indicated by the six-sided polygonal shape of the cut edge of the filter paper. It will be noted that the ends of pleat sections 321, 323 and 325 overlay the intermediate pleat sections in this view.

The end of the bellows 301 has an opening as shown in Figure 18 before the clamping plate 313 is inserted and the pleats folded over to completely enclose the clamping plate. The clamping plate 313 has a generally triangular shape with the apexes cut off to provide flattened portions. The flattened portions of clamping plate 313 fit under pleat sections 321, 323 and 325, and the flat portions are above and inside the inner fold line of the intermediate pleats 322, 324 and 326. The end trapezoidal section of intermediate pleats 322, 324 and 326 are folded over the clamping plate 313, as shown by pleats 322 and 324 in Figure 17. The other intermediate pleat 321 is broken away to show the edge of clamping plate 313.

Referring to Figure 16 the clamping plate 313 with bellows 301 folded about the edge thereof is positioned about tube 303 on top of bellows 302. Then the end plate 314 positioned to clamp the bellows 302 between the clamping plates 312 and 313 and bellows 301 between clamping plate 313 and end plate 314. The flange 315 of the end plate is then secured to the tube.

The bellows filter 301 is sealed at the lower end by a clamping plate 331 having the same general outline as plate 313 and the lower end of the bellows is folded in the same manner as the top end. The clamping plate 331 has an offset flange 332 and shoulder 333 with an annular series of apertures 334 and is secured to tube 303 by flange 335. The end of bellows 301 is clamped to the clamping plate 331 by end plate 336 which is secured by flange 337 to the clamping plate flange 332. A perforated metal hexagonal or cylindrical tube may be positioned inside bellows 301 to provide internal support.

A bushing 341 is positioned in the upper end of tube 303 to provide a spring seat and a seat for seal 342 which is held in the bushing by retainer 343. At the lower end a similar bushing 346 is employed to support seal 347 which is held in position by retainer 348. The retainers are secured in the bushings by suitable means such as a press fit or welding.

The series combination coarse and fine filter element 304 is then positioned on base 351 by post 352 and within container 353. The base 351 has a central passage 356 into which the hollow post 352 is secured by suitable means such as threads. The post has a metering orifice 357 and the hollow center provides a pasage for the fine filtered fluid. The bore 361 located concentrically with the passage 356 provides a chamber for the lower end of the combination filter element 304 and for the reception of the coarse filtered fluid. A passage 362 providing an outlet for the coarse filtered fluid and passage 363 for a pressure gauge is connected with bore 361. A gasket 366 provides a seal between the base 351 and the element 304 around the bore 361. Outside of this seal inlet passage 367 in the base supplies oil to the filter units and a valved by-pass passage 368 may be provided to by-pass excessive pressures.

The upper end of post 352 has an internally threaded bore portion 371. A bolt 372, which passes through an aperture in the top of the housing 353, is threaded into bore 371 to secure the housing in position. A spring 376 is compressed between the bushing 341 and a shoulder on bolt 372 to hold the filter element 304 in position.

Figure 20:
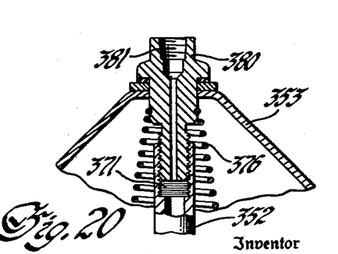
Figure 20 is a fragmentary view of Figure 16 showing a modification.

If it is desired to provide the fine filtered oil inlet passage 356 with an alternative outlet or connection for a pressure gauge, the bolt 380 may be made hollow as shown in Figure 20, to provide a passage 381 connecting with the hollow post or fine-filtered fluid outlet.

In this series combination filter the oil or liquid under pressure enters through inlet passage 367 and surrounds coarse filter bellows 301. The oil is filtered through this filter bellows rapidly and surrounds fine filter bellows 301 at the pressure required for lubrication. The normal supply of lubricating oil under pressure will flow through apertures 334 in clamping plate 331 into bore 361 to outlet 362. A small portion of the oil will flow through fine filter bellows 302 and the apertured tube 303. Since the oil is confined between tube 303 and post 352 and the seals 342 and 347, the oil will flow through metering orifice 357, which will limit the volume of oil that passes through the fine filter and then through hollow post 352 to the outlet passage 356.

In the construction shown in Figure 16 the combined series filter element 304 is replaced by unscrewing the bolt 372 from the post 352 which may be permanently fixed to the base. The bolt 372, housing 353 and spring 376 is then removed as a unit and the filter element 304 may be slipped off the post. Then a new element may be slipped over the post, which may be tapered adjacent the top to facilitate the initial sliding of the seals. The filter element 304 may also be replaced in the same manner as described above in connection with Figure 12 if the bolt 352 is unscrewed at the base 351.

The above examples are illustrative of specific embodiments of the invention. Other modifications within the terms of the appended claims will be apparent to those skilled in the art.

I claim:

1. A filter element comprising a one-piece bellows of filter material, said bellows consisting of a plurality of transversely disposed pleats arranged in a number of longitudinal series, each pleat of the alternate longitudinal series being connected by a fold line to a portion of a pleat of each intermediate longitudinal series located immediately above and below said each pleat, the inner folded edges of the pleats defining a central aperture through said bellows, a perforated tube positioned in said aperture, a clamping plate positioned inside the alternate end pleats at each end of the bellows and positioned on top of the intermediate end pleats located immediately below said alternate pleats, a portion of said intermediate end pleats being folded over said clamping plate, an end plate engaging said end pleats, means fastening said end plate and clamping plate to secure and seal the end of said bellows, and support means supporting said plates on said tube.

2. The invention defined in claim 1, said clamping plate having rounded peripheral edge portions within said alternate pleats adjacent the outer edge of said pleats, said clamping plate having straight peripheral edge portions over the intermediate pleats which are substantially on the center line of said intermediate pleats.

3. The invention defined in claim 1, said clamping plate having an annular bead at the peripheral edge.

4. The invention defined by claim 1, said support means at one end of the bellows being imperforate and sealed to said tube to provide a fluid-tight closure for said one end of the bellows, said support means at the other end of said bellows being perforated to provide an outlet.

5. The invention defined in claim 1, said bellows having four longitudinal series of transversely disposed pleats, each pleat having a trapezoidal section, the short base and the ends of said trapezoidal section being substantially equal to provide a substantially regular octagonal prism with a square internal aperture.

6. The invention defined in claim 1, said bellows having six longitudinal series of transversely disposed pleats, each pleat having a trapezoidal section to provide a dodecagonal prismatic bellows with a hexagonal internal aperture.

7. A filter comprising a housing having an inlet and an outlet passage, a hollow post closed at one end and sealed at the other end to said housing around said second passage, a tube positioned around said post, a pair of seals between said post and tube, said post and tube having apertures between said seals, a bellows consisting of a plurality of transversely disposed pleats arranged in a number of longitudinal series, each pleat of the alternate longitudinal series being connected by a fold line to a portion of a pleat of each intermediate longitudinal series located immediately above and below said each pleat, the inner folded edges of the pleats defining a central aperture through said bellows, said tube passing through said aperture, a clamping plate positioned inside the alternate end pleats at each end of the bellows and positioned on top of the intermediate end pleats located immediately below said alternate pleats, a portion of said intermediate end pleats being folded over said clamping plate, an end plate engaging said end pleats, means fastening said end plates and clamping plates to secure and seal the ends of the bellows to said tube.

8. In a filter, a bellows wall formed of filter material, said bellows consisting of a plurality of transversely disposed pleats arranged in a number of axial series, each pleat having axially spaced lower outwardly and upper inwardly extending wall portions between outer and inner transversely extending fold lines, diagonal fold lines between said outer and inner transversely extending fold lines connecting the upper portion of one pleat and the lower portion of the transversely adjacent pleat in the transversely adjacent series, an end seal comprising an outer plate contacting the outer surface of the lowest end wall portions of transversely alternate pleats, an inner plate having a lower surface contacting the inner surface of said lowest end wall portions and clamping said lowest end wall portions against said outer plate, said inner plate having an upper surface contacting the inner surface of the transversely adjacent lowest end wall portions, said transversely adjacent lowest end wall portions being folded over the edge of said inner plate with the inner surface contacting the lower surface of said inner plate and the outer surface contacting said outer plate, and said inner and outer plates being clamped together to secure and seal the wall portions between the plates.

9. In a filter element, a tubular bellows of filter material having a plurality of transverse pleats, each of said pleats having two side sections, each of said pleats extending circumferentially substantially less than the full circumference of said tubular bellows and positioned in a number of aligned series of said pleats, each of the individual pleats of each series of pleats being positioned longitudinally between the adjacent pleats of the circumferentially adjacent series of pleats, said bellows having an end edge in a plane substantially at right angles to the longitudinal axis and extending through the center of a pleat of one series forming a terminal half pleat having one side section and a terminal full pleat having two side sections in the circumferentially adjacent series of pleats, said terminal full pleat being longitudinally displaced inwardly from said terminal half pleat, a clamping plate positioned inside said terminal full pleat between said two side sections with the outer side section of said terminal full pleat against the outside of the clamping plate, said clamping plate extending over a part of said side section of said terminal half pleat, the remaining part of said side section of the terminal half pleat being folded over against the outside of said clamping plate, an end plate engaging said remaining part of said side section of said terminal half pleat on the outside of said clamping plate and said outer side section of said terminal full pleat, and means to clamp said clamping plate and said end plate together to grip said outer side section of said terminal full pleat and said remaining part of said side section of said terminal half pleat.

References Cited in the file of this patent

UNITED STATES PATENTS

| | | |
|---|---|---|
| 609,769 | Barr | Aug. 30, 1898 |
| 1,074,008 | Nagel | Sept. 23, 1913 |
| 1,818,392 | Hans | Aug. 11, 1931 |
| 1,906,417 | Renfrew et al | May 2, 1933 |
| 1,928,049 | Danills | Sept. 26, 1933 |
| 1,970,666 | Martinet | Aug. 21, 1934 |
| 2,076,935 | Bruckhalter | Apr. 13, 1937 |
| 2,098,725 | Hurn | Nov. 9, 1937 |
| 2,164,966 | Tutein | July 4, 1939 |
| 2,186,440 | Williams | Jan. 9, 1940 |
| 2,196,821 | Arnold | Apr. 9, 1940 |
| 2,239,868 | Williams | Apr. 29, 1941 |
| 2,325,399 | Houston | July 27, 1943 |
| 2,387,368 | Vokes | Oct. 23, 1945 |
| 2,406,308 | Vokes | Aug. 20, 1946 |
| 2,556,521 | Chase | June 12, 1951 |

FOREIGN PATENTS

| | | |
|---|---|---|
| 401,287 | Great Britain | Oct. 30, 1933 |
| 452,547 | Great Britain | Aug. 25, 1936 |
| 494,316 | Great Britain | Oct. 24, 1938 |